US000001548H

United States Statutory Invention Registration [19]

[11] Reg. Number: H1548

Iwagaki

[45] Published: Jun. 4, 1996

[54] SILVER HALIDE COLOR PHOTOSENSITIVE MATERIAL

[75] Inventor: Masaru Iwagaki, Hino, Japan

[73] Assignee: Konica Corporation, Hino, Japan

[21] Appl. No.: 120,968

[22] Filed: Sep. 13, 1993

[30] Foreign Application Priority Data

Sep. 17, 1992 [JP] Japan ..... 4-248215

[51] Int. Cl.[6] ..... G03C 1/76; G03C 1/005

[52] U.S. Cl. ..... 430/533; 430/567

[58] Field of Search ..... 430/567, 533

[56] References Cited

U.S. PATENT DOCUMENTS

| | | | |
|---|---|---|---|
| 4,820,624 | 4/1989 | Hasebe et al. | 430/567 |
| 4,968,595 | 11/1990 | Yamada et al. | 430/567 |
| 5,057,403 | 10/1991 | Kume et al. | 430/533 |
| 5,061,611 | 10/1991 | Sakata et al. | 430/533 |
| 5,071,736 | 12/1991 | Ikenoue et al. | 430/533 |
| 5,225,319 | 7/1993 | Fukazawa et al. | 430/533 |

FOREIGN PATENT DOCUMENTS

| | | | |
|---|---|---|---|
| 2388008 | 11/1978 | France | C08C 63/66 |

OTHER PUBLICATIONS

Database WPI No. 92–327388 JPA–4–234,039; Aug. 21, 1992.

*Primary Examiner*—Charles T. Jordan

*Assistant Examiner*—Chrisman D. Carroll

*Attorney, Agent, or Firm*—Bierman and Muserlian

[57] ABSTRACT

A silver halide color photosensitive material is provided, comprising a tranparent support having a thickness of not more than 120 μm and provided thereon photosensitive layers, wherein at least one of the photosensitive layers contains a silver halide emulsion containing silver halide grains controlled so that sensitivity specks are localized at a specific site of the grains or in the vicinity thereof; and the transparent support is a polyester prepared by polycondensation of an aromatic dibasic acid and a glycol, wherein the polycondensation is conducted in the presence of (i) an aromatic dicarboxylic acid having a metal sulfonate group or an ester thereof, and (ii) a polyalkyleneglycol or (iii) a saturated aliphatic dicarboxylic acid or an ester thereof, each as copolymerizing components, during the course of polymerization reaction.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE COLOR PHOTOSENSITIVE MATERIAL

FIELD OF THE INVENTION

This invention relates to a silver halide color photosensitive material and particularly to a silver halide color photosensitive material improved in stability against the variations of development conditions and in resistance against pressure.

BACKGROUND OF THE INVENTION

In recent years, cameras have been made smaller in size, simpler in operation and easier in portability, so that phototaking opportunities have been increased. However, many users have been requiring to make camera body further smaller in size, so that smaller-sized cameras have been studied with keeping high image qualities. On the other hand, films for general use, so-called 135 size roll films, have been loaded in fixed and standardized cartridges. Therefore, the above-mentioned state of things has been an obstacle to make cameras smaller in size. For making cartridges smaller in size, it is the most effective and simple way to make films, namely, photosensitive materials thinner in thickness. The above-mentioned effective and simple way can be achieved by making the supports of photosensitive materials thinner than heretofore in use.

On the other hand, each fixed, standardized cartridge for 135 film size has so far been limited up to load a 36-exposure film. There have been demands for inputting image information as many as possible into a single piece of cartridge. The demands can also be achieved by making the supports of photosensitive materials thinner than heretofore in use.

However, when making a support thinner, the silver halide color photosensitive material is liable to be bent, so that a defect is so produced in the bent portions that the image density may be varied. This defect is a peculiar problem produced due to the pressure applied locally to a photographic component layer and has been used to produce not so often on the conventional supports having a substantial thickness.

In contrast to the above, the thin supports each useful to silver halide color photosensitive materials have been disclosed in Japanese Patent Publication Open to Public Inspection (hereinafter abbreviated to JP OPI Publication) Nos. 1-244446/1989, 3-54551/1991 and 3-84542/1991, and U.S. Pat. Nos. 4,217,441, 4,241,170 and 5,138,024. Some improvements can be made by the proposals given above, however, the above-mentioned problems cannot satisfactorily be solved.

Also apparently, there has been a problem that silver halide color photosensitive materials are liable to be affected by the variations of processing solutions when the supports thereof are made thinner.

JP OPI Publication Nos. 63-305345/1988 and 64-77047/1989 disclose each the silver halide photographic emulsions with which a development is started at a corner and/or the neighborhood of the corner. These disclosures do not suggest at all any improvements against the Variations produced when carrying out a development process nor any improvement of the resistance against pressure produced by bending a thin support, though these disclosures report the improvements of development progress.

SUMMARY OF THE INVENTION

It is an object of the invention to provide a silver halide color photosensitive material that is high in the resistance against pressure produced by bending the support thereof even if the support is thin and is hard to be affected by the variations of processing solutions.

The invention claimed in claim 1 having the object for solving the above-mentioned problems relates to a silver halide color photographic material comprising a transparent support having a thickness of not thicker than 120 μm, provided thereon with at least one red-sensitive layer, green-sensitive layer, blue-sensitive layer and non-photosensitive layer, wherein at least one of the photosensitive layers contains silver halide grains having the sensitivity speck which is formed locally in a specific site of the surfaces of the silver halide grains and the neighborhood thereof, and the transparent support is made of a copolymerized polyester prepared by polycondensation of an aromatic dibosic acid and a glycol, wherein the polyester is prepared by making present an aromatic dicarboxylic acid having a metal sulfonate group or an ester thereof, a polyalkylene glycol and/or a saturated aliphatic dicarboxylic acid or an ester thereof each as the copolymerization components from the time of starting an reaction.

[Description of reference numerals]

21, 22: Plates

23: Sample setting position

24: Hinges

DETAILED DESCRIPTION OF THE INVENTION

-Photosensitive layers-

Figure 1:
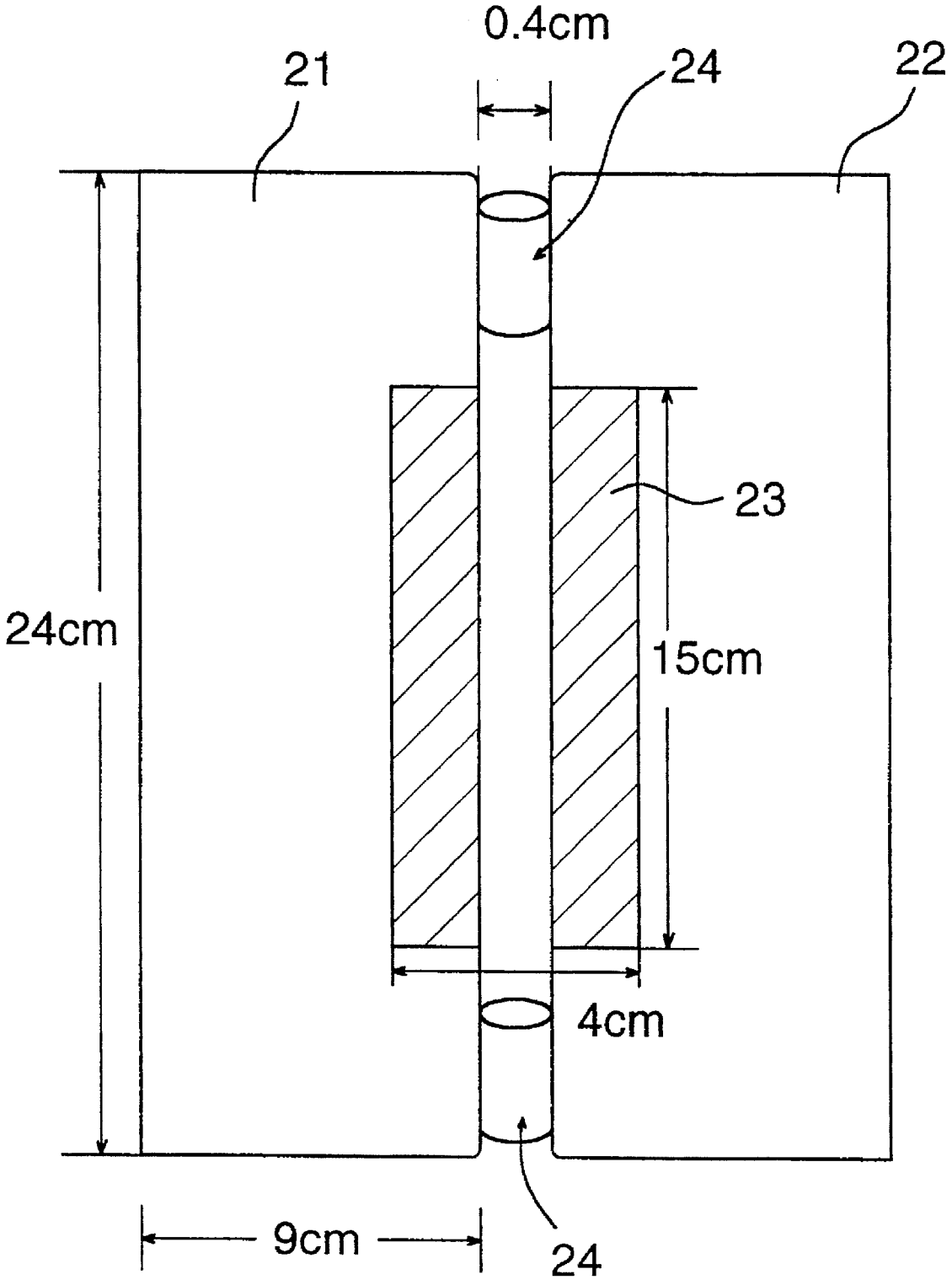
FIG. 1 is the front view of a bending tester.

The silver halide color photographic photosensitive materials of the invention can be served as full-color photographic photosensitive materials. The full-color photographic photosensitive materials are generally comprised of a red-sensitive layer containing a cyan coupler, a green-sensitive layer containing a magenta coupler and a blue-sensitive layer containing a yellow coupler. Each of these color-sensitive layers may be a single layer or plural layers, or may also be comprised of plural layers. There is no special limitation to the layer arrangement order for these color-sensitive layers, but various layer arrangement orders can be used to meet the application purposes of the subject photosensitive materials. For example, a red-sensitive layer, a green-sensitive layer and a blue-sensitive layer can be arranged in this order from the side of a support or, on the contrary, a blue-sensitive layer, a green-sensitive layer and a red-sensitive layer can also be arranged in this order from the support side.

Between two photosensitive layers having the same color sensitivity, another photosensitive layer having different color sensitivity may also be interposed. In addition to the three layers, namely, a red-sensitive layer, a green-sensitive layer and a blue-sensitive layer, the 4th color-sensitive layer and so forth may further be arranged, for the purpose of improving color reproducibility. The layer arrangements applied with the 4th color-sensitive layer and so forth are described in, for example, JP OPI Publication Nos. 61-34541/1986, 61-201245/1986, 61-198236/1986 and 62-160448/1987. The above-mentioned layer arrangements can be referred thereto. When this is the case, the 4th color-sensitive layer and so forth may be arranged to any layer-coating positions. Further, the 4th color-sensitive layer and so forth may be comprised of a single layer or plural layers.

Between each of the above-mentioned color-sensitive layers and to the uppermost and lowermost layers, a variety of non-photosensitive layers may also be provided.

The above-mentioned non-photosensitive layers may contain the couplers, DIR compounds and so forth such as those given in JP OPI Publication Nos. 61-43748/1986, 59-113438/1984, 59-113440/1984, 61-20037/1986 and 61-20038/1986. These layers may also contain a color cross-over preventive such as those commonly used. These layers may further serve as auxiliary layers including, for example, a filter layer and an intermediate layer such as those described in RD 308119, p. 1002, Item VII-K.

The layer arrangements applicable to the photosensitive materials of the invention include, for example, the regular layer arrangements, reverse layer arrangements, unit layer arrangements and so forth such as those described in RD 308119, p. 1002, Item VII-K.

When there are two photosensitive layers each having the same color sensitivity, these photosensitive layers may be the same with each other or may have the double-layered structure comprising a high-speed emulsion layer and a low-speed emulsion layer, such as those described in West German Patent No. 1,121,470 and British Patent No. 923, 045. If this is the case, it is usually preferable when the photosensitivities may be lowered in order toward a support. It is also allowed to interpose a non-photosensitive layer between each of the emulsion layers. It is further allowed that a low-speed emulsion layer is arranged farther from the support and a high-speed emulsion layer is arranged closer to the support, as described in JP OPI Publication Nos. 57-112751/1982, 62-200350/1987, 62-206541/1987 and 62-206543/1987.

For a concrete example thereof, it is allowed to arrange the layers in the following order from the farthest position to the nearest position from the support side; a low-speed blue-sensitive layer (BL)/a high-speed blue-sensitive layer (BH)/a high-speed green-sensitive layer (GH)/a low-speed green-sensitive layer (GL)/a high-speed red-sensitive layer (RH)/a low-speed red-sensitive layer (RL); BH/BL/GL/GH/RH/RL; or BH/BL/GH/GL/RL/RH.

AS described in JP Examined Publication No. 55-34932/1980, it is also allowed to arrange a blue-sensitive layer/GH/RH/GL/RL in order from the farthest position from the support side. As described in JP OPI Publication Nos. 56-25738/1981 and 62-63936/1987, it is further allowed to arrange a blue-sensitive layer/GL/RL/GH/RH in order from the farthest position from the support side.

As described in JP Examined Publication No. 49-5495/1974, three photosensitive layers having the same color sensitivity, but not having the same photosensitivity may be used. These three layers are arranged as follows; a high-speed silver halide emulsion layer to the upper layer, a medium-speed silver halide emulsion layer to the middle layer, and a low-speed silver halide emulsion layer to the lower layer. As described in JP OPI Publication No. 59-202464/1984, a medium-speed silver halide emulsion layer, a high-speed silver halide emulsion layer and a low-speed silver halide emulsion layer may also be arranged in this order from the farthest position from the support side.

When three layers each having the different photosensitivities are arranged as mentioned above, these three layers may be arranged in any layer coating order. For example, a high-speed silver halide emulsion layer, a low-speed silver halide emulsion layer and a medium-speed silver halide emulsion layer; or a low-speed silver halide emulsion layer, a medium-speed silver halide emulsion layer and a high-speed silver halide emulsion layer may be arranged in this order. It is also allowed to arrange four or more photosensitive layers each having the same color sensitivity. In this case, the layers may also be freely arranged in any order.

As mentioned above, a variety of layer structures and arrangements can be selected so as to meet the application purposes of photosensitive materials to be used.

-Silver halide grains-

In this invention, the above-mentioned photosensitive layers contain silver halide grains of which the sensitivity speck is locally formed in a specific site of the silver halide grain surfaces and in the vicinity of the specific site.

In the invention, silver halide grains may be fine grains having a grain size of not larger than about 0.2 μm, or may also be large-sized grains having a grain projected area-equivalent diameter up to about 10 μm.

The grain configurations of silver halide may include, for example, those having regular-shaped crystals such as a cube, an octahedron and a tetradecahedron; those having irregular-shaped crystals such as the globular-shaped and the tabular-shaped; those having a crystal imperfection such as a twinned crystal; or the complexes thereof.

The crystal structures may be a uniformed structure, a structure having a halogen composition ununiformed between the inside and the outside, or a layer structure. Further, the crystal structures may also be a structure in which silver halides each having different compositions are joined together by an epitaxial junction or are joined with a compound such as silver thiocyanate and lead oxide other than silver halides. It is further allowed to use a mixture of grains having various crystal forms.

Among them, silver halides having a tabular-shaped crystal forms are preferred. These silver halides are to have a diameter/thickness ratio within the range of 2 to 8 and, preferably 3 to 7. The above-mentioned tabular-shaped grains can readily be prepared in the processes described in, for example, Gutoff, "Photographic Science and Engineering" Vol. 14, pp. 248~257, (1970); U.S. Pat. Nos. 4,434,226, 4,414,310, 4,433,048 and 4,439,520; British Patent No. 2,112,157; and so forth.

In the invention and when making use of a silver halide emulsion containing tabular-shaped silver halide grains, it is preferable to make present the tabular-shaped silver halide grains having a diameter/thickness ratio within the range of 2 to 8 in a proportion of not less than 70% of the total grains in terms of the projective area. It is particularly preferable to make present the tabular-shaped silver halide grains having a diameter/thickness ratio within the range of 3 to 7 in a proportion of not less than 70% of the total grains in terms of the projective area.

In the invention, the sensitivity speck is formed locally in the specific site of the surfaces of silver halide grains and the neighborhood thereof.

The expression, "a specific site of the silver halide grain surface" stated herein means an areawise limited region between the crystal faces occupying the wide region of silver halide grain surface. The above-mentioned areawise limited regions between the crystal faces occupying the wide region of silver halide grain surfaces may include concretely, for example, a crystal corner, a crystal edge, or a crystal face having a smaller area proportion among the wide crystal faces when two or more faces such as (111), (100) and (110) faces are made present together.

The above-mentioned crystal faces each having a smaller area proportion among the wide crystal faces when two or more faces such as (111), (100) and (110) faces co-exist; such crystal faces may include, for example, a (110) face formed in a edge having a smaller area proportion among the wide (111) faces when the edge forms the (110) face in an octahedral crystal formed of (111) faces; or a (100) face formed in a corner position having a smaller area proportion among the wide (111) faces when the corner forms the (100) face.

The position of the sensitivity speck formed at silver halide grains can be determined in the following manner. A silver halide emulsion layer is so exposed to light as to make change every sensitivity speck to latent images; the exposed photosensitive emulsion layer is developed with a diluted developer prepared by further diluting a developer of practical use; and the developed silver is observed through an electron microscope. In other words, the position of a sensitivity speck can be defined as the point of producing the above-mentioned developed silver on the surface of a silver halide grain, (hereinafter referred to as a development initiating point). To be more concrete, the position of a sensitivity speck can be determined in the following manner. A silver halide emulsion layer exposed to light is developed at 20° C. for 3 minutes with a developer prepared by diluting by 10 times a common color-negative film developer such as CNK-4-43 (manufactured by Konica Corp.); the developed emulsion layer is dipped in an acetic acid solution to stop the development and is then washed up; gelatin is decomposed by a gelatin decomposable enzyme solution to separate and collect the silver halide grains; and the collected silver halide grains are observed through an electron microscope.

Not less than 20%, preferably not less than 60%, further not less than 70% and, particularly not less than 80% of the above-mentioned sensitivity specks are preferably made present at the specific sites on the surface area of the silver halide grains or in the vicinity thereof. The photosensitive nuclei are preferably made present in an area of not wider than 10% of the surface areas of the silver halide grains in and about the specific sites where the photosensitive nuclei are to be localized.

In the invention, silver halide emulsion each containing silver halide grains having localized sensitivity specks at the specific site, on the silver halide grain surface or in the vicinity thereof, such a silver halide emulsion is, preferably, a silver halide emulsion containing silver halide grains having localized sensitivity specks at the corners or in the vicinity of the corners of silver halide grain crystals. Thus, it is preferable that not less than 80% of the whole sensitivity specks locate within a circle whose center is the corner and whose radius is one third of the length of the line connecting the corner and an adjacent corner. In the invention, silver halide grains are to have (111) faces in an area of, preferably not less than 60%, further not less than 80% and, particularly not less than 95% of the total crystal surface areas.

In the invention, the silver halide grains having (111) faces of not less than 60% are preferably of the octahedral crystals or tabular-shaped twinned crystals.

The above-mentioned sensitivity specks can be formed, at the specific sites position of silver halide grain surfaces, or in the vicinity thereof, by a method having been well-known so far.

The position of forming sensitivity speck can be controlled by making present a substance capable of adsorbing to the surfaces of silver halide grains, when carrying out a chemical sensitization in the course of preparing an emulsion. The substance capable of adsorbing to the surfaces of silver halide grains may be added at any points of time, such as in the course of forming silver halide grains, immediately after forming the grains, before starting an after-ripening treatment, or at the time of carrying out the after-ripening treatment. For forming the sensitivity speck locally in and about the specific position of the surfaces of silver halide grains, it is preferred to add the above-mentioned substance before or at the same time when adding a chemical sensitizer (such as a gold or sulfur sensitizer). It is necessary to make the substance present at least in the course of progressing the chemical sensitization. It is generally preferred to make present the substance capable of adsorbing to the surfaces of silver halide grains in an amount of not less than 500 mg per mol of silver halide used, in the course of preparing an emulsion.

The substance capable of adsorbing to the surfaces of silver halide grains may be added at any temperature and, preferably at a temperature within the range of 30 ° to 80° C. For the purpose of enhancing the adsorbing power, it is preferable to add the substance at a temperature within the range of 50 ° to 80° C. The pH and pAg may be freely selected. It is preferred to have a pH of 6 to 9 and pAg of 8 to 9 at the point of time when a chemical sensitization is carried out.

The substances capable of adsorbing to the surfaces of silver halide grains may be freely selected. It is preferred to use a substance such as a sensitizing dye, an antifoggant and a stabilizer, which are necessary for carrying out an emulsion preparation process.

When the stabilizer is used, it is added in an amount within the range of 500 to 3,000 mg and, preferably 1,000 to 2,500 mg, per mol of silver halide used. When a sensitizing dye is used, it is added in an amount within the range of 500 to 2,000 mg and, preferably 600 to 1,000 mg, per mol of silver halide used.

The above-mentioned stabilizers include, for example, those described in Research Disclosure (RD) No. 308119, p. 998, Item VI, ibid, No. 17643, pp. 24~25 and, ibid, No. 18716, p. 649. The photographic sensitizing dyes include, for example, those described in Research Disclosure (RD) No. 308119, p. 996, Items VI-A-A, B, C, D, H, I, J, ibid, No. 17643, pp. 23~24 and, ibid, No. 18716, pp. 648~649.

-Silver halide emulsions-

In the invention, the silver halide emulsions may be of the polydisperse or monodisperse type. Among them, a monodisperse emulsion having a uniform grain size is preferred.

In the monodisperse emulsions preferably applicable to the invention, not less than 70%, preferably not less than 80% and, particularly not less than 90%, each by weight of the total silver halide contents is occupied by the silver halide having the grain sizes within the range of not less than ±20% of a weight average grain size d.

The term, "a weight average grain size d" stated above, means a grain size $d_i$ which maximizes a product of $n_i \times d_i^3$ in which $n_i$ represents the frequency of grains having grain size $d_i$ (The significant figures are counted by 3 figures and the number of the lowest figure is rounded.). The term, "a grain size $d_i$" herein means a diameter obtained when a grain projected image is converted into a circular having the same area. The above-mentioned grain size $d_i$ can be obtained in the following manner; for example, a grains are scattered on a flat sample table so as not to lie one upon another and are photographed by magnifying 10,000 to 50,000 times through an electron microscope and then the resulting printed grain diameters or the areas thereof are practically measured, (provided, wherein, the numbers of the grains are not less than 1,000 grains are selected at random). When the grain size distribution of a silver halide emulsion has a single peak, the degrees of the monodispersion can also be expressed by the spread of the distribution (or so-coiled variation coefficient) calculated out in the following formula.

{(Standard deviation of grain size distribution)/

(Average grain size)} × 100 = Spread of a distribution (%)

wherein the grain sizes are to be measured in accordance with the above-described measurement method, and the average grain size is regarded as an arithmetical mean calculated out in the following formula.

$$\text{Average grain size}=(\Sigma d_i n_i)/(\Sigma n_i)$$

Among the spreads of the distributions calculated out in the above-given formula, the narrower the spread is, the greater the degree of monodispersion is.

When the monodispersibility is expressed by the spread of the above-mentioned distribution, the silver halide emulsions of the invention are to have a distribution spread of, preferably, not more than 20% and, particularly, not more than 15%.

The silver halide emulsions of the invention can be prepared in the processes described in, for example, Research Disclosure (RD) No. 17643, pp. 22~23, (December 1978), "I, Emulsion Preparation and types"; ibid, No. 18716, p. 648; P. Glafkides, Chemie et Phisique Photographique, Paul Motel, 1967; G. F. Duffin, Photographic Emulsion Chemistry, (Focal Press, 1966); and V. L. Zelikman et al, Making and Coating Photographic Emulsion, (Focal Press, 1964).

It is also preferable to use the monodispersed emulsions described in, for example, U.S. Pat. Nos. 3,574,628 and 3,665,394, and British Patent No. 1,413,748.

When preparing the silver halide emulsions of the invention, the additives applicable thereto are described in, for example, Research Disclosure (RD) Nos. 17643, 18716 and 308119. Tables 1 through 3 indicate the places of the descriptions thereof in the above-mentioned RDs.

Particularly, the additives indicated in Table 2 can be subjected to physically and/or chemically ripening treatments, a spectrally sensitizing treatment and so forth.

TABLE 1

| [Items] | [RD 308119] |
|---|---|
| Iodide composition | p. 933 I-A |
| Preparation process | p. 993 I-A & p. 994 I-E |
| Crystal habit, | |
| Regular | p. 993 I-A |
| Twinned | p. 993 I-A |
| Epitaxial | p. 993 I-A |
| Halogen composition, | |
| Uniformed | p. 993 I-B |
| Not uniformed | p. 993 I-B |
| Halogen conversion | p. 994 I-C |
| Halogen substitution | p. 994 I-C |
| Metal content | p. 994 I-D |
| Monodispersion | p. 995 I-F |
| Solvent addition | p. 995 I-F |
| Latent image forming position, | |
| Surface | p. 995 I-G |
| Inside | p. 995 I-G |
| Applicable photosensitive material, | |
| Negative type | p. 995 I-II |
| Positive type (containing internally fogged grains) | p. 995 I-II |
| Mixed use with emulsion | p. 995 I-J |
| Desalting treatment | p. 995 II-A |

TABLE 2

| [Items] | [RD308119] | [RD17643] | [RD18716] |
|---|---|---|---|
| Chemical sensitizer | p. 996 III-A<br>p. 996 IV-A, B, C, D | p. 23 | p. 648 |
| Spectral sensitizer | p. 996 IV-A, B, C, D, H, I, J | pp. 23–24 | pp. 648–649 |
| Supersensitizer | p. 996 IV-A, E, J | pp. 23–24 | pp. 648–649 |
| Antifoggant | p. 998 VI | pp. 24–25 | p. 649 |
| Stabilizer | p. 998 VI | pp. 24–25 | p. 649 |

TABLE 3

| [Items] | [RD308119] | [RD17643] | [RD18716] |
|---|---|---|---|
| Color stain preventive | p. 1002 VII-I | p. 25 | p. 650 |
| Dye image stabilizer | p. 1001 VII-J | p. 25 | |
| Whitening agent | p. 998 V<br>p. 1003 VIII-C | p. 24<br>pp. 25–26 | |
| UV absorbent | XIII-C | | |
| Light absorbent | p. 1003 VIII | pp. 25–26 | |
| Light scattering agent | p. 1003 VIII | | |
| Filter dye | p. 1003 VIII | pp. 25–26 | |
| Binder | p. 1003 IX | p. 26 | p. 651 |
| Antistatic agent | p. 1006 XIII | p. 27 | p. 650 |
| Layer hardener | p. 1004 X | p. 26 | p. 651 |
| Plasticizer | p. 1006 XII | p. 27 | p. 650 |
| Lubricant | p. 1000 XII | p. 27 | p. 650 |
| Activator Coating aid | p. 1005 XI | pp. 26–27 | p. 650 |
| Matting agent | p. 1007 XVI | | |
| Developing agent, (contained in photosensitive material) | p. 1011 XX- | | |

For preventing a photographic characteristic deterioration possibly produced by formaldehyde gas, it is preferable that photosensitive materials are added by a compound capable of solidifying formaldehyde upon making reaction with each other, such as those described in U.S. Pat. Nos. 4,411,987 and 4,435,503.

There is no special limitation to the amounts of silver halides applicable to the silver halide color photosensitive materials of the invention, but silver halides are to be added in an amount within the range of, preferably, not more than 10 g/m$^2$ to not less than 3 g/m$^2$ and, particularly, not more than 7 g/m$^2$ to not less than 3 g/m$^2$, each in terms of the silver contents thereof.

There is also no particular limitation to the amount of silver used to a gelatin binder, but it is preferable to use silver in an amount of silver (amount by weight)/gelatin (amount by weight) within the range of 0.01 to 5.0 so as to meet a high- or low-speed emulsion layers or other application.

The silver halide emulsions relating to the invention are preferable to contain silver iodobromide having an average silver iodide content within the range of 4 to 20 mol % and, particularly, 5 to 15 mol %. The silver halide emulsions of the invention may also contain silver chloride in some amount, provided that the objects of the invention cannot be spoiled.

In the invention and when making combination use of a silver halide emulsion, that contains silver halide grains formed by localizing the development initiating point to the peculiar position of the silver halide grain surfaces and to the neighborhood thereof, and other silver halide emulsions than the above, the latter emulsions may be those having a regular-shaped crystals such as cubes, octahedrons and tetradecahedrons, those having an irregular-shaped crystals such as the globular- or tabular-shaped, those having an imperfect crystals such as twinned crystals, or the complexes thereof.

In the above-mentioned "other silver halide emulsions", the grain sizes of the silver halide grains may be of the finely sized grains of not larger than about 0.2 microns, the substantially larger sized grains having a projective area diameter up to about 10 microns. These emulsions may also be of the monodisperse type or the polydisperse type. Among them, however, monodisperse type emulsions are preferred as aforementioned.

In the invention, a variety of color couplers may be used.

The yellow couplers preferably applicable thereto include, for example, those described in U.S. Pat. Nos. 3,933,051, 4,022,620, 4,326,024, 4,401,752 and 4,248,961; JP Examined Publication No. 58-10739/1983; British Patent Nos. 1,425,020 and 1,476,760; U.S. Pat. Nos. 3,973,968, 4,314,023 and 4,511,649; and European Patent No. 249, 473A.

As for the magenta couplers, the compounds of the 5-pyrazolone type and pyrazoloazole type are preferred. The particularly preferable compounds are given in, for example, U.S. Pat. Nos. 4,310,619 and 4,351,897; European Patent No. 73,636; U.S. Pat. Nos. 3,061,432 and 3,725,067; Research Disclosure (RD) No. 24220 (June 1984); JP OPI Publication No. 60-33552/1985; Research Disclosure (RD) No. 24230 (June, 1984); JP OPI Publication Nos. 60-43659/1985, 61-72238/1986, 60-35730/1985, 55-118034/1980 and 60-185951/1985; U.S. Pat. Nos. 4,500,630, 4,540,654 and 4,556,630; and International Patent Publication No 88/04795.

The cyan couplers include, for example, those of the phenol type and the naphthol type. The preferable ones include, for example, those given in U.S. Pat. Nos. 4,052, 212, 4,146,396, 4,228,233, 4,296,200, 2,369,929, 2,810,171, 2,772,162, 2,895,826, 3,772,002, 3,758,308, 4,334,011 and 4,327,173; West German Patent OS Publication No. 3,329, 729; European Patent Nos. 121,365A and 249,453A; U.S. Pat. Nos. 3,446,622, 4,333,999, 4,775,616, 4,451,559, 4,427,767, 4,690,889, 4,254,212 and 4,296,199; and JP OPI Publication No. 61-42658/1986.

The preferable colored couplers for compensating the needless absorption of color forming dyes include, for example, those given in U.S. Pat. No. 4,163,670; JP Examined Publication No. 57-39413/1982; U.S. Pat. Nos. 4,004, 929 and 4,138,258; and British Patent No. 1,146,368. It is also preferable to use the couplers capable of compensating the needless absorption of color forming dyes by making use of the fluorescent dyes released when a coupling reaction is made, such as those described in U.S. Pat. No. 4,744,181; and the couplers having a dye precursor group as an elimination group capable of forming a dye upon reaction with a developing agent, such as those described in U.S. Pat. No. 4,777,120.

The preferable couplers having a suitably diffusible color dye include those described in, for example, U.S. Pat. No. 4,366,237; British Patent No. 2,125,570; European Patent No. 96,570; and West German Patent (OS) No. 3,234,533.

The typical examples of the polymerized dye forming couplers are given in U.S. Pat. Nos. 3,451,820, 4,080,211, 4,367,282, 4,409,320 and 4,576,910; British Patent No. 2,102,173; and so forth.

The couplers capable of releasing photographically useful residual groups upon coupling reaction can also preferably be used. The preferable DIR couplers each capable of releasing a development inhibitor are described in, for example, JP OPI Publication Nos. 57-151944/1982, 57-154324/1982, 60-184248/1985 and 63-37346/1988; and U.S. Pat. Nos. 4,248,962 and 4,782,012.

The preferable couplers capable of releasing a nucleus forming agent or a development accelerator imagewise when carrying out a development include, for example, those described in British Patent Nos. 2,097,140 and 2,131, 188, and JP OPI Publication Nos. 59-157638/1984 and 59-170840/1984.

Besides, the above, the couplers applicable to the photosensitive materials of the invention the completing couplers described in, for example, U.S. Pat. No. 4,130,427; the polyequivalent couplers described in, for example, U.S. Pat. Nos. 4,283,472, 4,338,393 and 4,310,618; the DIR redox compound releasing couplers, DIR coupler releasing couplers, DIR coupler releasing redox compounds or DIR redox releasing redox compounds each described in, for example, JP OPI Publication Nos. 60-185950/1985 and 62-24252/1987; the couplers capable of releasing the dyes which are recolored upon elimination, described in, for example, European Patent No. 173,302A; the bleach accelerator releasing couplers described in, for example, Research Disclosure (RD) Nos. 11449 and 24241 and JP OPI Publication No. 61-201247/1986; the ligand releasing couplers described in, for example, U.S. Pat. No. 4,553,477; and couplers capable of releasing leuco dyes, described in, for example, JP OPI Publication No. 63-75747/1988.

Further, a variety of couplers can be applied to the invention. The typical examples thereof include those described in the following RD Nos. 17643 and 308119. Table 4 indicates the places of the descriptions thereof.

TABLE 4

| [Items] | [RD 308119] | [RD 17643] |
|---|---|---|
| Yellow coupler | p. 1001 VII-D | p. 25 VII-C~G |
| Magneta coupler | p. 1001 VII-D | p. 25 VII-C~G |
| Cyan coupler | p. 1001 VII-D | p. 25 VII-C~G |
| Colored coupler | p. 1002 VII-G | p. 25 VII-G |
| DIR coupler | p. 1001 VII-F | p. 25 VII-F |
| BAR coupler | p. 1002 VII-F | |
| Other organic residual group releasing coupler | p. 1001 VII-F | |

The additives each applicable to the silver halide color photographic photosensitive materials of the invention can be added thereto in the dispersion processes described in, for example, RD 308119, p. 1007, Paragraph XIV.

-Transparent support-

The transparent support applicable to the silver halide color photographic photosensitive material of the invention are made of a copolymeric polyester having the copolymerization components comprising an aromatic dibasic acid, a glycol, an aromatic dicarboxylic acid having at least a metal sulfonate group, a polyalkylene glycol and/or a saturated aliphatic dicarboxylic acid. The above-mentioned supports will be detailed below.

The aromatic dibasic acids include, for example, terephthalic acid, isophthalic acid and 2,6-naphthalenedicarboxylic acid. Among them, terephthalic acid is preferable as aromatic dibasic acids. The glycols include, for example, ethylene glycol, propylene glycol, butanediol, neopentyl glycol, 1,4-cyclohexane dimethanol and p-xylylene alcohol.

The above-mentioned aromatic dicarboxylic acids having a metal sulfonate group include, for example, 5-sodium sulfoisophthalic acid, 2-sodium sulfoisophthalic acid, 4-sodium sulfoisophthalic acid, 4-sodium sulfo-2,6-naphthalene dicarboxylic acid, or the ester-forming derivatives represented by the following Formula (1), and the compounds in which the sodium is substituted by other metal such as potassium, lithium or the like.

Formula (1)

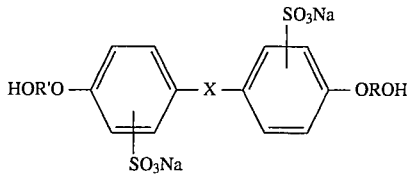

[X: $CH_3-\overset{|}{\underset{|}{C}}-CH_3$, $-CH_2-$, $-SO_2-$ or $-O-$;

R,R¹: $-(CH_2)_n$]

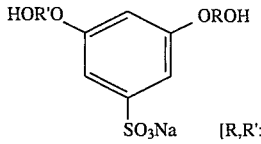

[R,R': $-(CH_2)_n-$]

In the copolymerized polyester comprising an aromatic dicarboxylic acid having a metal sulfonate group that can be detected by hydrolyzing the polyester, the amount of the aromatic dicarboxylic acid having a metal sulfonate group is preferably within the range of 2 to 7 mol % of the total carboxylic acid components. When the amount of the aromatic dicarboxylic acid having a metal sulfonate group is less than 2 mol % of the total acid components, there may be some instances where the roll set curl of a photographic film may not satisfactorily remedied. When exceeding 7 mol %, the heat resistance of a transparent support may sometimes be deteriorated.

The above-mentioned polyalkylene glycols include, for example, polyethylene glycol, polypropylene glycol and polytetramethylene glycol. In the invention, polyethylene glycol is preferable among the polyalkylene glycols. The molecular weight thereof is to be within the range of, ordinarily, 300 to 20,000 and, preferably, 300 to 1,500.

In the invention, it is preferable to add polyalkylene glycol in an amount within the range of 3 to 10% by weight to the total weights of the copolymerized polyester.

When the amount of polyalkylene glycol is less than 3% by weight, the roll set curl cannot be remedied even after completing a development and, in addition, the mechanical strength necessary for photographic films cannot be obtained because the stretchability of the subject film is lowered. On the contrary, when exceeding 10% by weight, any film having a satisfactory mechanical strength cannot be obtained, because polyalkylene glycol has a low mechanical property.

As for the saturated aliphatic dicarboxylic acids applicable to the copolymerized polyesters of the invention, it is preferable to use a saturated aliphatic dicarboxylic acid having 4 to 20 carbon atoms or a polyethyleneoxy-ω,ω'-diacetic acid [$HOOC—CH_2O-(C_2H_4O)_n-CH_2COOH$] having a number average molecular weight within the range of 500 to 5,000.

The saturated aliphatic dicarboxylic acids each having 4 to 20 carbon atoms include, for example, succinic acid, adipic acid and sebacic acid. Among them, adipic acid is preferable. Polyethyleneoxy-ω,ω'-diacetic acid having a number average of 2,000 to 4,000 is particularly preferable to be used.

The above-mentioned aliphatic dicarboxylic acids can be detected by hydrolyzing the copolymerized polyesters of the invention. Ordinarily, the proportion of the aliphatic dicarboxylic acid is preferably within the range of 3 to 25 mol % to the total ester bonds. When aliphatic dicarboxylic acid is contained, as a monomer unit, in a copolymerized polyester so that the amount of the aliphatic dicarboxylic acid can be within the above-mentioned range, the roll set curl of a photographic film can readily be remedied and, at the same time, a transparent support can be provided with practical heat resistance.

The copolymerized polyesters of the invention can preferably be prepared in an ester interchange reaction of the components mixed basically with (1) an aromatic dicarboxylic acid or the ester thereof, (2) an aromatic dicarboxylic acid having a metal sulfonate group, or the ester thereof, (3) polyalkylene glycol, (4) ethylene glycol, (5) saturated aliphatic dicarboxylic acid or the ester thereof, (6) a catalyst, and (7) a stabilizer.

The catalysts applicable to the above-mentioned ester interchange reaction include, for example, metal salts such as manganese, calcium, zinc and cobalt of acetic acid, fatty acid, carbonic acid or the like. Among them, the hydrates of manganese acetate or calcium acetate are preferably used and, in addition, the mixtures thereof are also preferably used.

It is also effective to add a hydroxide, the metal salts of an aliphatic carboxylic acid, a quaternary ammonium and so forth when the above-mentioned ester interchange reaction and/or a polycondensation are carried out, provided that the reaction cannot be spoiled, or that any polymers cannot be colored. Among them, sodium hydroxide, sodium acetate and tetraethyl hydroxy ammonium are preferred and, among them, sodium acetate is particularly preferred. They are preferably added in an amount within the range of $1\times10^{-2}$ to $20\times10^{-2}$ mol % to the total acid components.

The copolymerized polyester applicable to the invention is also allowed to contain a stabilizer such as phosphoric acid, phosphorous acid and the esters thereof and inorganic particles (such as those of silica, kaolin, calcium carbonate, calcium phosphate and titanium dioxide), each of which may be suitably added in the copolymerization stage. The copolymerized polyesters applicable to the invention are further allowed to contain the above-mentioned inorganic particles by adding them suitably after completing the polymerization.

The supports of the invention are those prepared by making use of a copolymerized polyester made in the form of uniform random copolymer by making present aromatic dicarboxylic acid having at least metal sulfonate group, a polyalkylene glycol and/or saturated aliphatic dicarboxylic acid each as the copolymerization components from the time of starting an ester exchange reaction and, then, they are reacted together.

The copolymerized polyesters are also allowed to contain, without any trouble, a dye, a UV absorbent, an antioxidant and so forth which are suitably added in the stage of either polymerization or post-polymerization.

It is preferable that the transparent supports of the invention are to contain a specific copolymerized polyester and an antioxidant.

The above-mentioned antioxidants shall not be specially limited to the kinds thereof, but they include, typically, a hindered phenol type compound, an allylamine type compound, a phosphite type compound and a thioester type antioxidant. Among them, the hindered phenol type compounds are preferred.

In the transparent supports, the antioxidants are usually contained in a proportion within the range of 0.01 to 2% by weight and, preferably, 0.1 to 0.5% by weight to the polymerized polyesters used. When the antioxidant content is less than 0.01% by weight, the effects of the photographic characteristics are deteriorated and, when exceeding 2% by weight, there may be some instances where the transparent support may be unsuitable, because the turbidity of the copolymerized polyester is increased. The antioxidants may also be used independently or in combination.

For the purpose of preventing a light piping phenomenon (an edge fogging phenomenon) from producing when light is made incident from an edge into a transparent support coated thereon with a photographic emulsion layer, the transparent photographic support of the invention is to contain preferably a dye. The dyes to be compounded with the above-mentioned purpose shall not specially be limited to the kinds thereof. However, from the viewpoint of a film base casting process, a dye having an excellent heat resistance is preferably used. For example, Such dyes may include an anthraquinone type chemical dye. The transparent supports are preferably have a gray dyed tone such as those of common photosensitive materials. The dyes may also be used independently or in combination mixedly. As for the dyes, the dyes such as SUMIPLAST manufactured by Sumitomo Chemical Co., Ltd., Diaresin manufactured by Mitsubishi Chemical Co., Ltd., MACROLEX manufactured by Bayer AG., and so forth may be used independently or suitably in combination in the mixed forms.

The transparent supports of the invention can be prepared in the-following manner. For example, after satisfactorily drying the above-mentioned copolymerized polyester or a copolymerized polyester composition containing the above-mentioned copolymerized polyester and an antioxidant compounded if required or at least one selected from the group consisting of sodium acetate, sodium hydroxide and tetraethyl hydroxy ammonium, the resulting dried matter is fusedly extruded to be in the sheet form through an extruder being kept at a temperature within the range of 260 ° to 320° C., a filter, a mouthpiece and so forth and the resulting fused polymer is then cooled down to be solidified on a cooling drum being rotated, so that an unstretched film can be obtained. After then, the unstretched film is biaxially stretched in the longitudinal and lateral directions and the resulting biaxially stretched film is fixed by heat and thereby the transparent support can be prepared.

The film stretching conditions shall not be specified by one and the same rule, but they are varied to meet the copolymerization compositions of a copolymerized polyester. However, the longitudinally stretching rate is 2.5 to 6.0 times within the temperature range of the glass transfer temperature (Tg) of copolymerized polyester to Tg+100° C.; and the laterally stretching rate is 2.5 to 4.0 times within the temperature range of Tg+5°C. to Tg+50° C. The resulting biaxially stretched film is then fixed by heat and cooled down. In this case, the film may also be slacken out in the longitudinal and/or lateral directions, if required.

The transparent supports of the invention may be a single layered film or sheet formed in the method such as described above and may also be a support having a multilayered structure in which a film or sheet formed in the above-mentioned method and another film or sheet made of other materials are laminated in a co-extrusion method or in a lamination method.

There is no special limitation to the thickness of the resulting transparent supports of the invention. However, the thickness thereof is, ordinarily, not thicker than 120 μm and within the range of, preferably, 40 to 120 μm and, particularly, 50 to 110 μm. The local thickness variations of transparent supports are, preferably, within 5 μm, further, within 4μm and, particularly, not thicker than 3 μm.

When the thickness of a transparent support is set to be within the above-mentioned range, no problem will be raised on the strength of the subject film and the curl control property even after photographic component layers are coated on and, in addition, the film thickness can be kept within the range of the aforementioned total film thickness. Further, when the local variations of the transparent support thickness is kept within 5 μm, any uneven coating and uneven drying can be prevented when coating the photographic component layers.

-Sublayer-

In advance of forming the photographic component layers, the surfaces of the transparent supports of the invention, on which photographic component layers are to be formed, may be subjected to a surface activation treatment such as a corona discharge treatment and/or may be coated with a sublayer, if required.

The above-mentioned sublayers include, typically, those described in, for example, JP OPI Publication Nos. 59-19941/1984, 59-77439/1984 and 59-224841/1984 and JP Examined Publication No. 58-53029/1983. A sublayer provided to a transparent support surface opposite to the above-mentioned photographic component layers is sometimes called a backing layer.

-Silver halide color photosensitive material-

The silver halide color photosensitive materials of the invention can be applied to a variety of color photosensitive materials typified by color negative film for general or cinematographic use, color reversal film for slide or TV use, color paper, color positive film and color reversal paper.

Of the silver halide color photosensitive materials of the invention, the total layer thickness of all the hydrophilic colloidal layers each arranged to the emulsion layer coated side is, preferably, not thicker than 24 μm, further, not thicker than 20 μm and, particularly, not thicker than 18 μm. The above-mentioned layer thickness herein means a layer thickness measured under the rehumidified conditions at 25° C. and 55% RH (for two days long). The layer swelling rate $T_{1/2}$ can be measured in the procedures well-known in the art. For example, it can be measured by making use of the swellometer described in A. Green et al, "Photographic Science and Engineering", Vol. 19, No. 2, pp. 124~129. $T_{1/2}$ is herein defined as a time required to reach one half of the saturated layer thickness that is defined as 90% of the maximum swelled layer thickness obtained when a development is made with a color developer at 30° C. for 3 minutes 15 seconds.

Layer swelling rate $T_{1/2}$ can be controlled by adding a layer hardener to gelatin serving as a binder or by changing the aging conditions after completing a coating. The swelling ratio is preferably within the range of 150 to 400%. The swelling ratios can be calculated out of the maximum swelled layer thickness obtained under the above-mentioned conditions, in accordance with the formula; (The maximum swelled layer thickness—Layer thickness)/Layer thickness.

The silver halide color photosensitive materials of the invention can be developed in the ordinary processes described in, for example, the foregoing RD 17643, p. 29 and RD 18716, p. 615, the left column to the right column.

When making use of the silver halide color photosensitive materials of the invention in the roll-shaped form, it is preferable to take the cartridge-loaded form. The most popular form of the cartridges is a patrone in the current 135 film format. Besides, the cartridges proposed in the following patents can also be used.

Namely, JP Utility Model OPI Publication No. 58-67329/1983; JP OPI Publication Nos. 58-181035/1983, 58-182634/1983; JP Utility Model OPI Publication No. 58-195236/1983; U.S. Pat. No. 4,221,479; JP Application Nos.

63-57785/1988, 63-183344/1988, 63-325638/1988, 1-25362/1989, 1-21862/1989, 1-30246/1989, 1-20222/1989, 1-21863/1989, 1-37181/1989, 1-33108/1989, 1-85198/1989, 1-172595/1989, 1-172594/1989 and 1-172593; and U.S. Pat. Nos. 4,846,418, 4,848,693 and 4,832,275.

The invention can also be applied to "A miniature sized photographic roll film patrone and a film camera", Japanese patent application 4-16934/92, filed on Jan. 31, 1992 by Toshihiko Yagi et al.

For obtaining a dye image by making use of a silver halide color photosensitive material of the invention, a commonly known development process is carried out after making an exposure. The silver halide color photosensitive materials of the invention can be developed in the common processes such as those described in the foregoing RD 17643, pp. 28–29, RD 18716, p. 647, and RD 308119, Paragraph XIX.

[EXAMPLES]

Now, the examples of the invention will be detailed below. However, the embodiments of the invention shall not be limited thereto.

(EXAMPLE 1)

A. Preparation of Silver Halide Emulsion

An octahedral silver iodobromide emulsion mainly having (111) faces was prepared in a double-jet process in accordance with the process described in JP OPI Publication No. 60-138538/1985.

The resulting emulsion was proved that the average grain size was 1.05 μm, the distribution spread was 9% the silver iodide contents were 30% in the cores and 0.1 mol % in the shells, the average silver iodide content was 9 mol % and the proportion of (111) faces was 98%. Now, the resulting emulsion is hereinafter named Em-101. Besides the above, Em-102 (with 0.71 μm) and Em-103 (with 0.40 μm) were each prepared so that the configuration and core/shell structure could bear a resemblance to those of Em-101 and the average grain sizes were each different from that of Em-101. Em-102 and Em-103 were each prepared by changing the amounts of an aqueous silver nitrate solution and an aqueous halide solution each to be added to the seed crystals.

Further, a tabular-shaped silver iodobromide emulsion mainly having (111) faces was prepared in a double-jet process in accordance with the process described in JP OPI Publication No. 3-94248/1991.

The resulting emulsion was proved to be 1.32 μm in the average grain size, 3.3 in the ratio of the average grain diameter/the grain thickness, 96% in the projected area occupied by the grains having not less than 2.0 in the ratio of the grain diameter/the grain thickness, and 14% in the distribution spread. It was also proved that the silver iodide contents were 30% in the cores and 0.1 mol % in the shells, the average silver iodide content was 9.0 mol % and the proportion of (111) faces was 94%. The resulting emulsion is hereinafter named Em-201. Besides, Em-202 (with 0.86 μm) and Em-203 (with 0.51 μm) were each prepared so that the configuration and core/shell structure could bear a resemblance to those of Em-101 and the average grain sizes were each different from that of Em-201. Em-202 and Em-203 were each prepared by changing the amounts of an aqueous silver nitrate solution and an aqueous halide solution each to be added to the seed crystals.

(Control of Development Starting Point)

The position of the development starting point was controlled by changing the point of time for adding a sensitizing dye in the course of chemically sensitizing and color sensitizing the resulting emulsions. In other words, the position of the development starting point was controlled by selecting either the sensitizing dye is to be added in advance of adding a chemical sensitizer or it is to be added after completing the chemical sensitization.

<Sensitizer 1>

Sodium thiosulfate

<Sensitizer 2>

Chloroauric acid (in 0.3 mg) and ammonium thiocyanate (in 15 rag)

<Methanol solution containing sensitizing dye>

A methanol solution containing SD-A (in 70 mg), SD-B (in 70 mg) and SD-C (in 70 mg)

<Stabilizer>

ST-1 (in 1.0 g)

[Example of the method for dispersively forming the development starting points on crystal faces]

Silver halide emulsion Em-101 (containing 1 mol of silver halide) was adjusted to be 55° C. and pAg 8.0. While stirring the emulsion, an aqueous sensitizer 1 solution and an aqueous sensitizer 2 solution were added in this order to the emulsion, so that a ripening treatment was carried out for 120 minutes. After completing the ripening, the temperature was lowered to 40°C. and a methanol solution containing a sensitizing dye was added. A further stirring was made for 20 minutes and, finally, antifoggant AF-1 and stabilizer ST-1 were added (Em-101A).

Silver halide emulsions Em-102, Em-103, Em-201, Em-202 and Em-203 were each treated in the same manner as mentioned above and were then sensitized. The amounts of sensitizers 1 and 2 used therein were controlled to meet the variations of the silver halide crystal sizes so as to obtain the maximum photographic sensitivity. The amounts of the sensitizers used therein were also controlled to meet the variations of silver halide crystal sizes.

The emulsions prepared in the above-mentioned process (Em-101A, 102A, 103A, 201A, 202A, 203A) were proved to be the silver halide emulsions each mainly having a development starting points dispersively on the (111) faces of the silver halide crystals.

[Example of the process for locally forming development starting points]

Silver halide emulsion Em-101 (containing 1 mol of silver halide) was adjusted to be 55° C., and pAg 8.0. While stirring the emulsion, an aqueous sensitizer 1 solution and an aqueous sensitizer 2 solution were added in this order to the emulsion, so that a ripening treatment was carried out for 90 minutes. Next, antifoggant AF-1 was added and the temperature was lowered to 40° C. and a methanol solution containing a sensitizing dye was added and, finally, stabilizer ST-1 were added. The amounts of sensitizers 1 and 2 used therein were so controlled as to have the maximum photographic sensitivity (Em-101B).

Silver halide emulsions Em-102, Em-103, Em-201, Em-202 and Em-203 were each treated in the same manner as mentioned above and were then sensitized. The amounts of sensitizers 1 and 2 used therein were controlled to meet the variations of the silver halide crystal sizes so as to obtain the maximum photographic sensitivity. The amounts of the sensitizers used therein were also controlled to meet the variations of silver halide crystal sizes.

The emulsions prepared in the above-mentioned process (Em-101B, 102B, 103B, 201B, 202B, 203B) were proved to be the silver halide emulsions containing silver halide grains each having a development starting points mainly at the corner of the silver halide crystal or in the vicinity thereof. It was also proved that, in the circle having the center at the corner and a radius of one third of the length of the line connecting between the corners adjacent to each other, the distribution of the development starting points enclosed in the circle was 82%.

The chemical structures of SD-A, SD-B, SD-C, ST-1 and AF-1 will be given below.

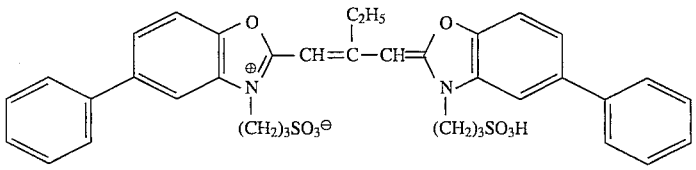

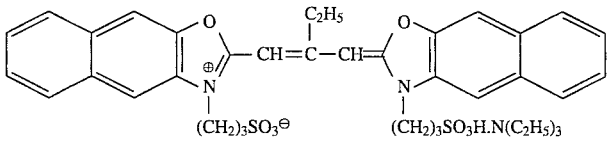

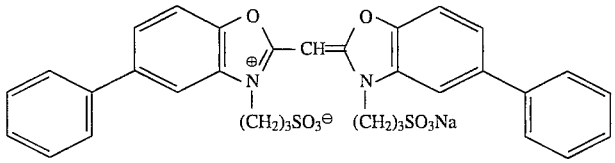

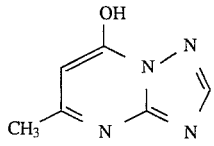

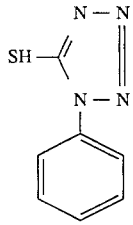

(Comparative transparent support 1)

Calcium acetate hydrate of 0.1 part by weight was added to 100 parts by weight of dimethyl terephthalate and 64 parts by weight of ethylene glycol and the resulting mixture thereof was subjected to an ester exchange reaction in an ordinary method. To the resulting product, an ethylene glycol soluton containing 28 parts by weight of 5-sodium sulfoisophthalate (in a concentration of 35% by weight), 8 parts by weight of polyethylene glycol (having a number average molecular weight of 400), 0.05 parts by weight of antimony trioxide, 0.13 parts by weight of trimethyl phosphate and 0.02 parts by weight of sodium hydroxide were each added. Next, the temperature was gradually lowered and the pressure was reduced and, then a polymerization was carried out at 280°C. and 0.5 mmHg, so that a copolymerized polyester could be obtained.

The resulting polyester was vacuum dried at 150°C. and was then fusedly extruded at 280°C. The resulting extruded matter was so rapidly cooled down as to be solidified on a cooling drum, so that an unstretched film could be prepared. The resulting unstretched film was stretched 3.3 times longer in the longitudinal direction at 120° C. and further 3.3 times longer in the lateral direction at 120° C. After that, the stretched film was fixed with heat at 180° C. for 30 seconds, so that a 80 μm-thick biaxially stretched film could be obtained.

The resulting biaxially stretched film was served as comparative transparent support 1 and the sublayers were each coated on both sides of the transparent support in the following manner.

There prepared a sublayer coating solution comprising 100 parts by weight of a resin solution for sublayers, that was prepared by emulsifying and polymerizing the following compositions, 0.2 parts by weight of the following surfactant, 0.3 parts by weight of hexamethylene-1,6-bis-(ethylene urea) and 900 parts by weight of water. The resulting resin solution for sublayers was so coated as to have a wet layer thickness of 20 μm and then dried up. The resulting transparent support having the sublayers is hereinafter sometimes called simply a transparent support.

<Compositions>

| | |
|---|---|
| 2-hydroxyethyl methacrylate | 75 parts |

-continued

| | |
|---|---|
| Butyl acrylate | 90 parts |
| t-butyl acrylate | 75 parts |
| Stryene | 60 parts |
| Sodium dodecylbenzene sulfonate | 6 parts |
| Ammonium persulfate | 1 part |
| Water | 700 parts |

<Surfactant>

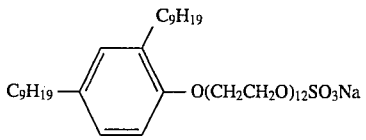

Next, a upper sublayer coating solution comprising 10 parts by weight of gelatin, 0.2 parts by weight of saponin and 1,000 parts by weight of water was so coated as to have a wet layer thickness of 20 μm and then dried up.

(Inventive transparent support 2)

Dimethyl terephthalate of 100 parts by weight, 69 parts by weight of ethylene glycol, 6.9 parts by weight of dimethyl 5-sodium sulfoisophthalate (4.3 mol % per total ester bonds), 8 parts by weight of polyethylene glycol (having an number average molecular weight of 400), 0.47 parts by weight of sodium acetate, 0.13 parts by weight of Irganox 1010, 0.13 parts by weight of Ultranox 626 (that is a registered trade mark owned by GE Specialty Chemicals Co. and the product is manufactured by them.), 0.027 parts by weight of zinc acetate (dihydrate) and 0.05 parts by weight of antimony trioxide were each heated up to 220° C. in an atmosphere of nitrogen, so that methanol was distilled off. After completing the ester exchange reaction, the temperature was gradually raised and the pressure was reduced. Then a polymerization was carried out at 270° C. and 0.5 mmHg, so that a copolymerized polyester could be obtained. The vacuum drying, fusedly extrusion, cooling, stretching and sublayer-coating were each performed in the same manners as in Support 1, so that Support 2 could be obtained.

(Inventive transparent support 3)

Calcium acetate hydrate of 0.1 parts by weight and 0.05 parts by weight of antimony trioxide were added as the ester exchange catalysts into 100 parts by weight of dimethyl terephthalate, 64 parts by weight of ethylene glycol, 8 parts by weight of dimethyl 5-sodium sulfoisophthalate (abbreviated to SIP, and at 5 mol %/the whole ester bond) and 10 parts by weight of polyethyleneoxy-ω,ω"-diacetic acid (abbreviated to PEO and having a number average molecular weight of 3,000), so that an ester exchange reaction was carried out in an ordinary method. To the resulting product, 0.1 parts by weight of trimethyl phosphate and 0.2 parts by weight of Irganox 1010 (manufactured by Ciba-Geigy AG.) for serving as an antioxidant were each added. The temperature was gradually raised and the pressure was reduced and then a polymerization was carried out at 280° C. and not higher than 0.5 mmHg, so that a copolymerized polyester having an intrinsic viscosity of 0.55 could be obtained. Support 3 was obtained in the same manners as in Support 2.

(Preparation of silver halide color photosensitive material)

The layers having the following compositions were each provided onto the foregoing comparative transparent support 1, so that sample 101 that was a multilayered color photosensitive material could be prepared.

(Compositions of photosensitive layers)

The amounts of silver halides and colloidal silver coated will be indicated by a unit of g/m$^2$ in terms of the metal silver contents. The amounts of the couplers, additives and gelatin added will be indicated by a unit of g/m$^2$. The amounts of the sensitizing dyes added will be indicated by a mol number per mol of the silver halides contained in one and the same layer.

<Sample 101>

| | |
|---|---|
| Layer 1: An antihalation layer | |
| Black colloidal silver | 0.16 |
| UV absorbent (UV-1) | 0.20 |
| High boiling solvent (Oil-1) | 0.20 |
| Gelatin | 1.23 |
| Layer 2: An interlayer | |
| Compound (SC-1) | 0.15 |
| High boiling solvent (Oil-2) | 0.17 |
| Gelatin | 1.27 |
| Layer 3: A low-speed red-sensitive layer | |
| A silver iodobromide emulsion, (having an average grain size of 0.38 μm and a silver iodide content of 8.0 mol %) | 0.50 |
| A silver iodobromide emulsion, (having an average grain size of 0.27 μm and a silver iodide content of 2.0 mol %) | 0.21 |
| Sensitizing dye (SD-1) | $2.8 \times 10^{-4}$ |
| Sensitizing dye (SD-2) | $1.9 \times 10^{-4}$ |
| Sensitizing dye (SD-3) | $1.9 \times 10^{-5}$ |
| Sensitizing dye (SD-4) | $1.0 \times 10^{-4}$ |
| Cyan coupler (C-1) | 0.48 |
| Cyan coupler (C-2) | 0.14 |
| Colored cyan coupler (CC-1) | 0.021 |
| DIR compound (D-2) | 0.020 |
| High boiling solvent (Oil-1) | 0.53 |
| Gelatin | 1.30 |
| Layer 4: A medium-speed red-sensitive layer | |
| A silver iodobromide emulsion, (having an average grain size of 0.52 μm and a silver iodide content of 8.0 mol %) | 0.62 |
| A silver iodobromide emulsion, (having an average grain size of 0.38 μm and a silver iodide content of 8.0 mol %) | 0.27 |
| Sensitizing dye (SD-1) | $2.3 \times 10^{-4}$ |
| Sensitizing dye (SD-2) | $1.2 \times 10^{-4}$ |
| Sensitizing dye (SD-3) | $1.6 \times 10^{-5}$ |
| Sensitizing dye (SD-4) | $1.2 \times 10^{-4}$ |
| Cyan coupler (C-1) | 0.15 |
| Cyan coupler (C-2) | 0.18 |
| Colored cyan coupler (CC-1) | 0.030 |
| DIR compound (D-2) | 0.013 |
| High boiling solvent (Oil-1) | 0.30 |
| Gelatin | 0.93 |
| Layer 5: A high-speed red-sensitive layer | |
| A silver iodobromide emulsion, (having an average grain size of 1.00 μm and a silver iodide content of 8.0 mol %) | 1.27 |
| Sensitizing dye (SD-1) | $1.3 \times 10^{-4}$ |
| Sensitizing dye (SD-2) | $1.3 \times 10^{-4}$ |
| Sensitizing dye (SD-3) | $1.6 \times 10^{-5}$ |
| Cyan coupler (C-2) | 0.12 |
| Colored cyan coupler (CC-1) | 0.013 |
| High boiling solvent (Oil-1) | 0.14 |
| Gelatin | 1.91 |
| Layer 6: An interlayer | |
| Compound (SC-1) | 0.09 |
| High boiling solvent (Oil-2) | 0.11 |
| Gelatin | 0.80 |

-continued

| | |
|---|---|
| Layer 7: A low-speed green-sensitive layer | |
| Silver iodobromide emulsion (Em-103) | 0.80 |
| Magenta coupler (M-1) | 0.41 |
| Colored magenta coupler (CM-1) | 0.12 |
| High boiling solvent (Oil-2) | 0.33 |
| Gelatin | 1.95 |
| Layer 8: A medium-speed green-sensitive layer | |
| Silver iodobromide emulsion (Em-102) | 0.87 |
| Magenta coupler (M-A) | 0.12 |
| Colored magenta coupler (CM-1) | 0.070 |
| DIR compound (D-2) | 0.025 |
| DIR compound (D-3) | 0.002 |
| High boiling solvent (Oil-2) | 0.10 |
| Gelatin | 1.00 |
| Layer 9: A medium-speed green-sensitive layer | |
| Silver iodobromide emulsion (Em-101) | 1.27 |
| Magenta coulper (M-A) | 0.10 |
| Colored magenta coupler (CM-1) | 0.012 |
| High boiling solvent (Oil-2) | 0.10 |
| Gelatin | 1.00 |
| Layer 10: A yellow filter layer | |
| Yellow collodidal silver | 0.08 |
| Color stain preventive (SC-1) | 0.15 |
| Formalin scavenger (HS-1) | 0.20 |
| High boiling solvent (Oil-2) | 0.19 |
| Gelatin | 1.10 |
| Layer 11: An interlayer | |
| Formalin scavenger (HS-1) | 0.20 |
| Gelatin | 0.60 |
| Layer 12: A low-speed blue-sensitive layer | |
| A silver iodobromide emulsion, (having an average grain size of 0.38 μm and a silver iodide content of 8.0 mol %) | 0.22 |
| A silver iodobromide emulsion, (having an average grain size of 0.27 μm and a silver iodide content of 2.0 mol %) | 0.03 |
| Sensitizing dye (SD-4) | $4.2 \times 10^{-4}$ |
| Sensitizing dye (SD-5) | $6.8 \times 10^{-5}$ |
| Yellow coupler (Y-1) | 0.75 |
| DIR compound (D-1) | 0.010 |
| High boiling solvent (Oil-2) | 0.30 |
| Gelatin | 1.20 |
| Layer 13: A medium-speed blue-sensitive layer | |
| A silver iodobromide emulsion (having an average grain size of 0.59 μm and a silver iodide content of 8.0 mol %) | 0.20 |

-continued

| | |
|---|---|
| Sensitizing dye (SD-4) | $1.6 \times 10^{-4}$ |
| Sensitizing dye (SD-6) | $7.2 \times 10^{-5}$ |
| Yellow coupler (Y-1) | 0.10 |
| DIR compound (D-1) | 0.010 |
| High boiling solvent (Oil-2) | 0.046 |
| Gelatin | 0.47 |
| Layer 14: A high-speed blue-sensitive layer | |
| A silver iodobromide emulsion (having an average grain size of 1.00 μm and a silver iodide content of 8.0 mol %) | 0.85 |
| Sensitizing dye (SD-4) | $7.3 \times 10^{-5}$ |
| Sensitizing dye (SD-6) | $2.8 \times 10^{-5}$ |
| Yellow coupler (Y-1) | 0.11 |
| High boiling solvent (Oil-2) | 0.046 |
| Gelatin | 0.80 |
| Layer 15: Protective layer 1 | |
| Silver iodobromide (having an average grain size of 0.08 μm and a silver iodide content of 1.0 mol %) | 0.40 |
| UV absorbent (UV-1) | 0.026 |
| UV absorbent (UV-2) | 0.013 |
| High boiling solvent (Oil-1) | 0.07 |
| High boiling solvent (Oil-3) | 0.07 |
| Formalin scavenger (HS-1) | 0.40 |
| Gelatin | 1.31 |
| Layer 16: Portective layer 2 | |
| Alkali-soluble matting agent (having an average particle size of 2 μm) | 0.15 |
| Polymethyl methacrylate (having an average particle size of 3 μm) | 0.04 |
| Lubricant (WAX-1) | 0.04 |
| Gelatin | 0.55 |

The above-mentioned photosensitive material further contained compounds Su-1 and Su-2, a viscosity controller, layer hardeners H-1 and H-2, stabilizer ST-1, antifoggants AF- 1 and AF-2 (having the weight average molecular weights of 10,000 and 1,100,000, respectively), dyes AI-1 and AI-2, and compound DI-1 (in 9.4 mg/m$^2$).

The following chemical structures represent the above-mentioned UV-1, Oil-1, SC-1, Oil-2, SD-1, SD-2, SD-3, SD-4, C-1, C-2, CC-1, D-1, D-2, M-A, CM-1, D-3, CM-2, SC-2, HS-1, SD-5, Y-1, SD-6, UV-2, WAX-1, Su-1, Su-2, H-1, H-2, ST-1, AF-2, AI-1, AI-2 and compound DI-1, respectively.

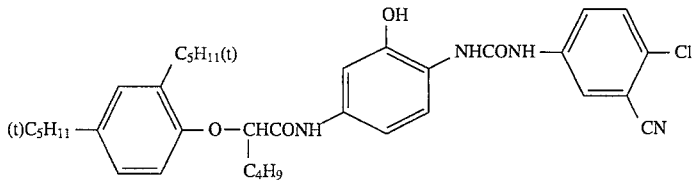

C-1

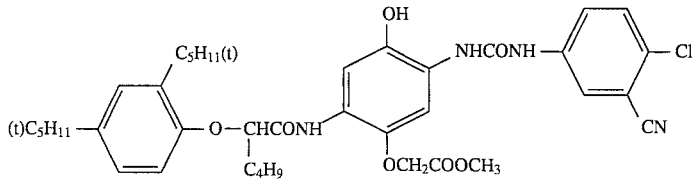

C-2

-continued
M-A
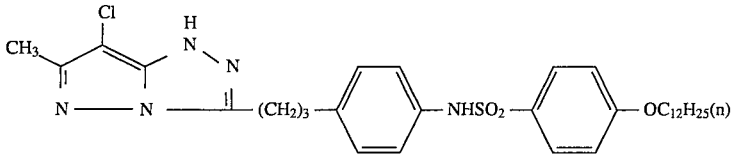
M-B
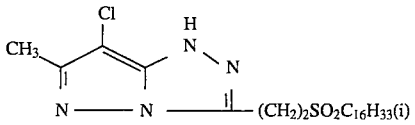
Y-1
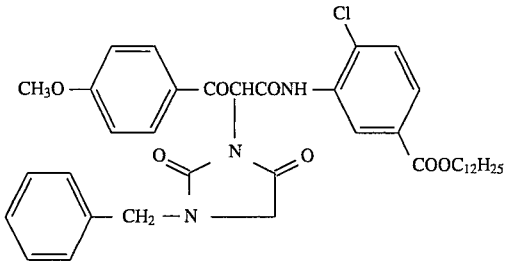
CC-1
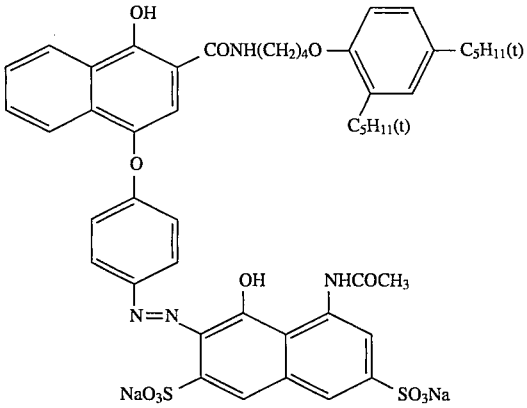
CM-1
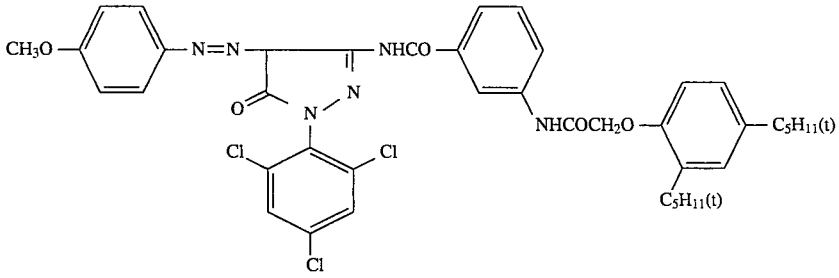
CM-2
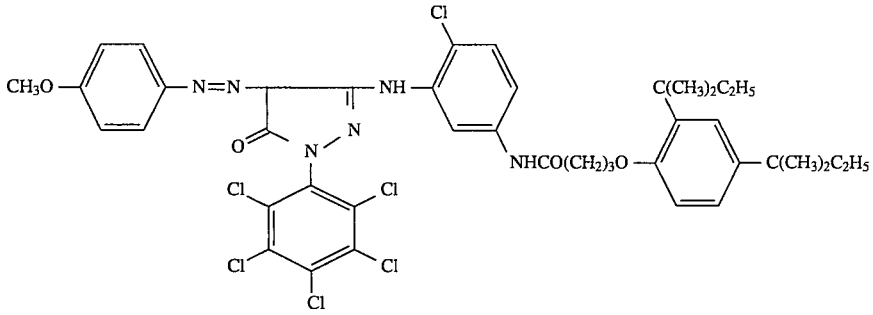

-continued
D-1
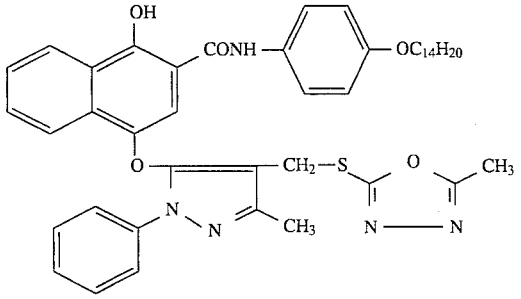
D-2
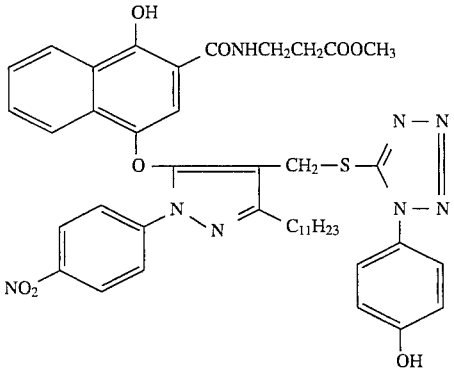
D-3
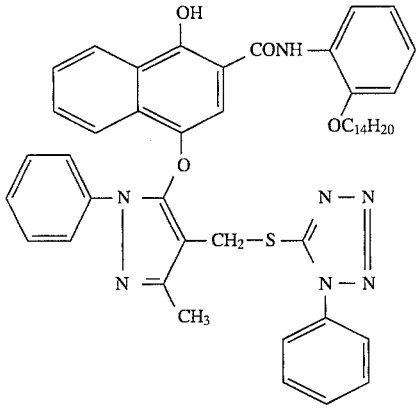
Oil-1
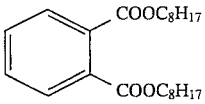
Oil-2
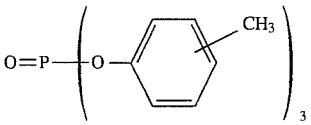
Oil-3
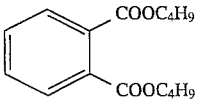

-continued
SC-1
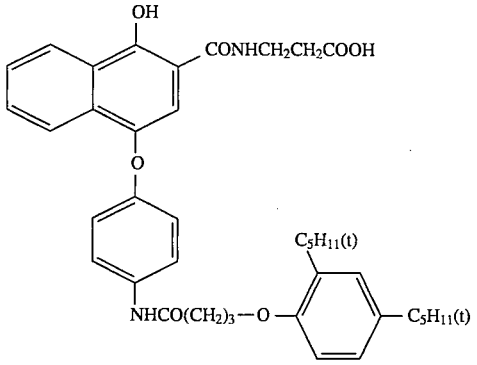
SC-2
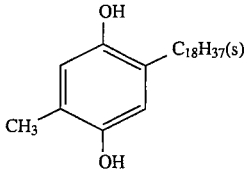
UV-1
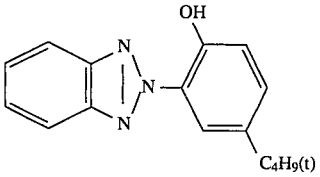
UV-2
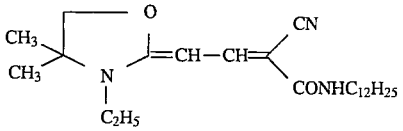
WAX-1
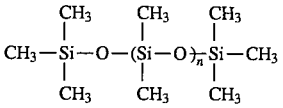
(weight-average molecular weight ≈ 3,000)
Su-1
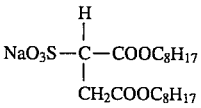
Su-2
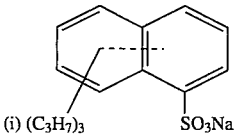
HS-1
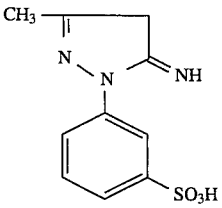
SD-1
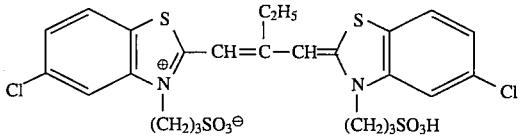

-continued
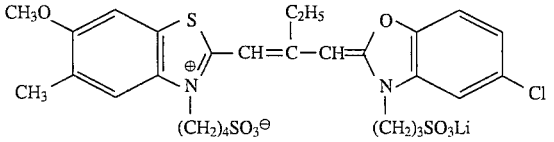
SD-2
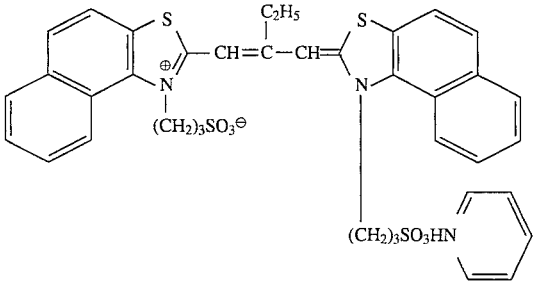
SD-3
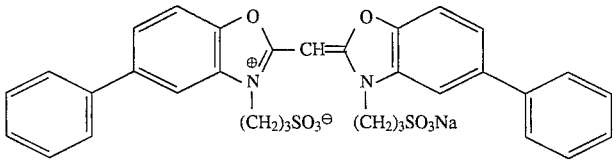
SD-4
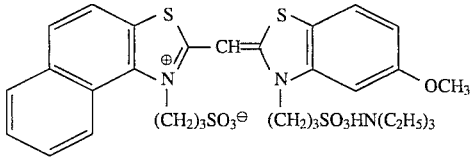
SD-5
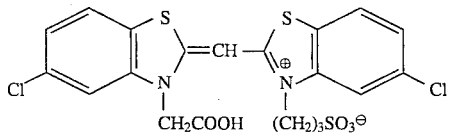
SD-6
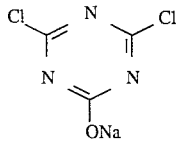
H-1
$(CH_2{=}CHSO_2CH_2)_2O$
H-2
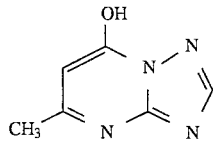
ST-1
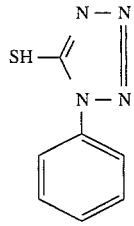
AF-1
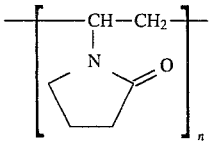
AF-2
n = Polymerization degrees -continued (Component A) (Component B) (Component C) DI-1

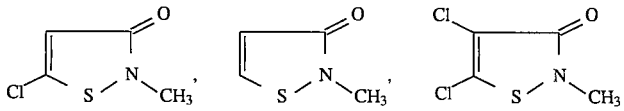

Component A:Component B:Component C = 50:46:4 (in mol ratio)

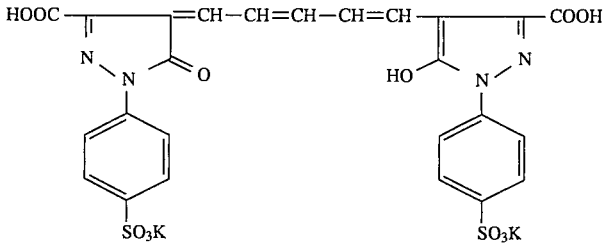

AI-1

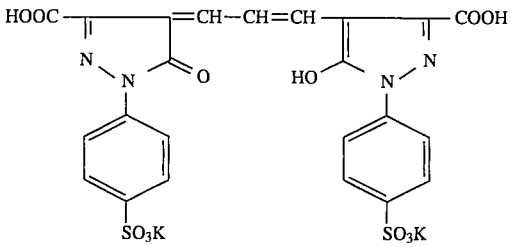

AI-2

(Coating of each photosensitive layer)

In the above-mentioned silver halide color photosensitive material, the silver halide emulsions used in the layers 7, 8 and 9 were grouped by A, B, C and D as shown in the following Table 5.

TABLE 5

| | Layer 7 | | Layer 8 | | Layer 9 | |
|---|---|---|---|---|---|---|
| | Emulsion | Development starting point | Emulsion | Development starting point | Emulsion | Development starting point |
| Group A | Em-103A | * | Em-102A | * | Em-101A | * |
| Group B | Em-103B | ** | Em-102B | ** | Em-101B | ** |
| Group C | Em-203A | * | Em-202A | * | Em-201A | * |
| Group D | Em-203B | ** | Em-202B | ** | Em-201B | ** |

*dispersively formed on (111) faces
**locally formed around the corner

As shown in the following Table 6, Samples 101 through 108 were each prepared by making combination use of the foregoing transparent supports and the emulsion groups shown in Table 5.

TABLE 6

| Sample No. | Support used | Emulsion group |
|---|---|---|
| 101 | Support 1 | A |
| 102 | Support 1 | B |
| 103 | Support 1 | C |
| 104 | Support 1 | D |
| 105 | Support 2 | A |
| 106 | Support 2 | B |
| 107 | Support 2 | C |
| 108 | Support 2 | D |
| 109 | Support 3 | B |

TABLE 6-continued

| Sample No. | Support used | Emulsion group |
|---|---|---|
| 110 | Support 3 | D |

(Development of silver halide color photosensitive materials)

Silver halide color photosensitive material Samples 101 through 110 were each exposed to white light through a wedge and they were each subjected to the pressure resistance tests of which will be detailed later by making use of the bending tester shown in FIG. 1 attached hereto. After that, they were each treated in the processing steps detailed in the following Table 7. Beside the above, each of the samples were treated with the color developers each having the different pH values, respectively, for the purpose of checking up the stability against the variations of the pH values of the developers.

TABLE 7

| Processing step | Processing time | Processing temperature (°C.) | Replenishing amount (ml) |
|---|---|---|---|
| Color developing | 3 min. 15 sec. | 38 ± 0.3 | 780 |
| Bleaching | 6 min. 30 sec. | 38 ± 2.0 | 150 |
| Washing | 3 min. 15 sec. | 20 ± 10 | 200 |
| Fixing | 6 min. 30 sec. | 38 ± 2.0 | 830 |
| Washing | 3 min. 15 sec. | 20 ± 10 | 200 |
| Stabilizing | 1 min. 30 sec. | 38 ± 5.0 | 830 |
| Drying | 2 min. | 50 ± 5.0 | — |

In Table 7, the replenished amounts are each indicated by an amount per sq.meter of a photographic photosensitive material used.

The color developer, bleacher, fixer, stabilizer and their replenishers used therein were each prepared as follows.

<Color developer>

| | |
|---|---|
| 4-amino-3-methyl-N-ethyl-N-(β-hydroxyethyl) aniline sulfate | 4.75 g |
| Sodium sulfite, anhydrous | 4.25 g |
| Hydroxylamine ½ sulfate | 2.0 g |
| Potassium carbonate, anhydrous | 37.5 g |
| Sodium bromide | 1.3 g |
| 3-sodium nitrilotriacetate (monohydrate) | 2.5 g |
| Potassium hydroxide | 1.0 g |
| Add water to make | 1 liter |
| Adjust pHs to be | pH 10.1 (in Process 1)<br>pH 9.9 (in Process 2) |

<Bleach>

| | |
|---|---|
| Iron (III) ammonium ethylenediamine tetraacetate | 100 g |
| 2-ammonium ethylenediamine tetraacetate | 10.0 g |
| Ammonium bromide | 150 g |
| Glacial acetic acid | 10 ml |
| Add water to make | 1 liter |
| Adjust pH with aqueous ammonia to be | pH 6.0 |

<Fixer>

| | |
|---|---|
| Ammonium thiosulfate | 175 g |
| Sodium sulfite, anhydrous | 8.5 g |
| Sodium metasulfite | 2.3 g |
| Add water to make | 1 liter |
| Adjust pH with acetic acid to be | pH 6.0 |

<Stabilizer>

| | |
|---|---|
| Formalin (in a 37% aqueous solution) | 1.5 ml |
| Konidux (manufacutred by Konica Corp.) | 7.5 ml |
| Add water to make | 1 liter |

<Color developer replenisher>

| | |
|---|---|
| Water | 800 ml |
| Potassium carbonate | 35 g |
| Sodium hydrogen carbonate | 3 g |
| Potassium sulfite | 5 g |
| Sodium bromide | 0.4 g |

-continued

| | |
|---|---|
| Hydroxylamine sulfate | 3.1 g |
| 4-amino-3-methyl-N-ethyl-N-(β-hydroxylethyl) aniline sulfate | 6.3 g |
| Potassium hydroxide | 2 g |
| Diethylenetriamine pentaacetic acid | 3.0 g |
| Add water to make | 1 liter |
| Adjust pH with potassium hydroxide or a 20% sulfuric acid to be | pH 10.18 |

<Bleach replenisher>

| | |
|---|---|
| Water | 700 ml |
| Iron (III) ammonium ⅓ diaminopropane tetraacetate | 175 g |
| Ethylenediamine tetraacetic acid | 2 g |
| Sodium nitrate | 50 g |
| Ammonium bromide | 200 g |
| Glacial acetic acid | 56 g |
| Adjust pH with aqueous ammonia or glacial acetic acid to be | pH 4.0 |
| Add water to make | 1 liter |

<Fixer replenisher>

| | |
|---|---|
| Water | 800 ml |
| Ammonium thiocyanate | 150 g |
| Ammonium thiosulfate | 180 g |
| Sodium sulfite | 20 g |
| Ethylenediamine tetraacetic acid | 2 g |
| Adjust pH with aqueous ammonia or glacial acetic acid to be | pH 6.5 |
| Add water to make | 1 liter |

<Stabilizer replenisher>

The same as the stabilizer (Bending test)

The bending tests were tried by making use of the bending tester shown in FIG. 1 in the following manner. A sample was put on sample-setting position 23 of the bending tester so that the emulsion side of the sample could be faced upward. Plates 21 and 22 were folded double by hinges 24 so that the emulsion side of the sample could be faced inward. A pressure was applied to the width of 4 mm for 5 seconds. The subject sample was removed from the bending tester and was then developed. Table 8 shows the density difference $\Delta D_G$ between the density of the green transmitted portion in the unbent portion of each sample and that in the bent portion of the same sample, that was regarded as the resulting pressure resistance. It is evaluated that the more the density difference $\Delta D_G$ was small, the more the pressure resistance was excellent.

(Evaluation of processing stability)

The magenta color development stability against the pH variations are expressed by the variation range $\Delta^{\gamma}$ of ${}^{\gamma}B$ obtained in Process 1 (at pH 10.1) in comparison with ${}_{\gamma}A$ obtained in Process 2 (at pH 9.9), (refer to the following formula).

$$\Delta^{\gamma}=\{({}^{\gamma}B-{}^{\gamma}A)/{}^{\gamma}A\}\times 100(\%)$$

The results thereof are shown in Table 8. It can be said that the more the values of $\Delta^{\gamma}$ is small, the more the stability is excellent.

(Evaluation of cutting property)

Each of the samples was cut into a 135 mm-width roll-shaped long length roll, and the 135-size standard perforations were made thereon by making use of a perforator for cellulose triacetate film use. The cut-edges of the resulting perforations were observed through a 200X microscope, and the following three-grade evaluation was made.

A . . . Cut edges were smooth and preferably clear-cut.

B . . . Cut edges were observed to have a slight unevenness.

C . . . Cut edges had some unfavorable remaining burrs.

The results thereof are shown in Table 8.

TABLE 8

| Sample No. | Pressure resistance | Processing stability | Cutting property | Remarks |
|---|---|---|---|---|
| 101 | 0.06 | 19 | B | Comparison |
| 102 | 0.05 | 19 | B | Comparison |
| 103 | 0.07 | 20 | B | Comparison |
| 104 | 0.07 | 20 | A | Comparison |
| 105 | 0.06 | 18 | A | Comparison |
| 106 | 0.04 | 17 | A | Invention |
| 107 | 0.06 | 19 | A | Comparison |
| 108 | 0.03 | 16 | A | Invention |
| 109 | 0.04 | 17 | A | Invention |
| 110 | 0.03 | 16 | A | Invention |

What is claimed is:

1. A silver halide color photosensitive material comprising a transparent support having a thickness of not more than 120 μm, having provided thereon a plurality of photosensitive layers including a red-sensitive layer, a green-sensitive layer, and a blue-sensitive layer, wherein at least one of said photosensitive layers contains a silver halide emulsion containing silver halide grains having sensitivity specks, not less than 80% of said sensitivity specks on said grains being localized within a circle, the center of which is the corner, and a radius thereof being one third the length of a line connecting said corner to an adjacent corner, or at an edge, said transparent support being a polyester prepared by polycondensation of an aromatic dibasic acid and a glycol, wherein said polycondensation is conducted in the presence of (i) an aromatic dicarboxylic acid having a metal sulfonate group or an ester thereof, and (ii) a polyalkylene glycol or (iii) a saturated aliphatic dicarboxylic acid or an ester thereof, each as copolymerized components, during the course of polymerization reaction.

* * * * *